(12) United States Patent
Kaufman et al.

(10) Patent No.: US 9,191,219 B2
(45) Date of Patent: Nov. 17, 2015

(54) NETWORK MULTICAST PEER DISCOVERY METHODS

(75) Inventors: Matthew Kaufman, Bonny Doon, CA (US); Michael Thornburgh, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 762 days.

(21) Appl. No.: 12/485,821

(22) Filed: Jun. 16, 2009

(65) Prior Publication Data

US 2013/0208620 A1    Aug. 15, 2013

(51) Int. Cl.
H04L 12/18 (2006.01)
(52) U.S. Cl.
CPC .................... *H04L 12/185* (2013.01)
(58) Field of Classification Search
None
See application file for complete search history.

(56) References Cited

U.S. PATENT DOCUMENTS

| | | | | |
|---|---|---|---|---|
| 6,330,671 B1* | 12/2001 | Aziz | ............................. | 713/163 |
| 7,355,968 B2* | 4/2008 | Liu et al. | ......................... | 370/225 |
| 7,401,132 B1* | 7/2008 | Krumel et al. | ................. | 709/220 |
| 8,284,773 B1* | 10/2012 | Woleben | ................. | H04L 12/18 370/310 |
| 2002/0029256 A1* | 3/2002 | Zintel et al. | ..................... | 709/218 |
| 2003/0147386 A1* | 8/2003 | Zhang et al. | .................... | 370/390 |
| 2003/0191828 A1* | 10/2003 | Ramanathan et al. | ......... | 709/221 |
| 2003/0212804 A1* | 11/2003 | Hashemi | ........................ | 709/228 |
| 2003/0233540 A1* | 12/2003 | Banerjee et al. | ............... | 713/153 |
| 2004/0044727 A1* | 3/2004 | Abdelaziz et al. | ............ | 709/203 |
| 2004/0098502 A1* | 5/2004 | Xu et al. | ........................ | 709/238 |
| 2005/0021817 A1* | 1/2005 | Shimizu | ............... | H04L 12/1854 709/231 |
| 2005/0226172 A1* | 10/2005 | Richardson | ......... | H04L 12/1813 370/260 |
| 2006/0168320 A1* | 7/2006 | Kidd et al. | ...................... | 709/238 |
| 2007/0250590 A1* | 10/2007 | Flannery et al. | ............... | 709/217 |
| 2008/0049607 A1* | 2/2008 | Xu | ................................. | 370/216 |
| 2008/0112315 A1* | 5/2008 | Hu | ...................... | H04N 7/173 18 370/230 |
| 2008/0165708 A1* | 7/2008 | Moore et al. | ................... | 370/260 |
| 2008/0205394 A1* | 8/2008 | Deshpande et al. | .......... | 370/390 |
| 2009/0077254 A1* | 3/2009 | Darcie et al. | ................... | 709/231 |

OTHER PUBLICATIONS

Kaufman, Matthew et al., "Multicast Systems, Methods, and Computer Program Products," U.S. Appl. No. 12/211,700, filed Sep. 16, 2008, 32 pages.

Kaufman, Matthew et al., "Self Organizing Peer-To-Peer System, Method, and/or Apparatus," U.S. Appl. No. 11/969,186, filed Jan. 3, 2008, 25 pages.

(Continued)

*Primary Examiner* — Gregory Sefcheck
*Assistant Examiner* — Jenkey Van
(74) *Attorney, Agent, or Firm* — Finch & Maloney PLLC (57) ABSTRACT

Methods, systems, and apparatus, including computer programs encoded on a computer storage medium, can include establishing communications with one or more peers in a communication group via one or more unicast communication channels; sending a participation information request on a multicast communication channel of a local network to discover peers that participate in the communication group; receiving one or more responses to the participation information request on the multicast channel of the local network from one or more peers that participate in the communication group; selecting one or more of the peers from which the one or more responses were received based on a network topology condition to reduce communication latency in at least a portion of the communication group; and communicating with the one or more selected peers to distribute information within the communication group.

16 Claims, 8 Drawing Sheets

(56) References Cited

OTHER PUBLICATIONS

Plummer, David C., "An Ethernet Address Resolution Protocol—or—Converting Network Protocol Addresses to 48.bit Ethernet Address for Transmission on Ethernet Hardware," RFC 826, Nov. 1982, 8 pages.

T. Narten, E. Nordmark, W. Simpson, "Neighbor Discovery for IP Version 6 (IPv6)," RFC 2461, Dec. 1998, 83 pages.

* cited by examiner

NETWORK MULTICAST PEER DISCOVERY METHODS

BACKGROUND

This document relates to peer discovery.

A communication network can forward data to one or more endpoints such as networked computers. A network can support one or more different native communication channels such as unicast and multicast. A unicast data packet can be delivered to a specific endpoint over a unicast channel. A multicast data packet can be delivered to multiple endpoints, each belonging to a multicast group, over a native multicast channel.

Multicasting is the ability of one or more endpoints to send a stream of information to multiple recipients, and often, a large number of recipients. Multicasting on an Internet Protocol (IP) based network such as the Internet can include using native network multicast that utilizes an address range reserved for multicasting. If packets are transmitted into a multicast enabled network with a multicast address as the destination, then endpoints subscribed to the multicast regardless of their location may receive the packets. Unfortunately, however, such native network multicasting may be disabled between some networks that constitute the Internet. For instance, native network multicasting may work inside an office's local area network but may not work between different local area networks connected by a larger network.

A different type of multicasting can form a virtual multicast channel using unicast channels between different endpoints to effect multicasting. For example, application level multicasting can use an overlay on top of a network, such as the Internet, to effect multicasting between endpoints associated with a communication group, e.g., peers in a peer-to-peer (P2P) overlay network or mesh network. An endpoint that is participating in a communication group can be referred to as a peer. Application level multicasting can include forwarding traffic from one endpoint to a different endpoint which, in turn, forwards the traffic to additional endpoints participating in the peer-to-peer overlay network using different unicast channels. An overlay topology can feature endpoints arranged in trees, meshes, rings, arbitrary random topologies, and other distributed structures.

SUMMARY

This document describes, among other things, technologies relating to peer discovery.

In one aspect, methods for peer discovery can include establishing communications with one or more peers in a communication group via one or more unicast communication channels, the communication group arranged to distribute information between group members; sending a participation information request on a multicast communication channel of a local network to discover peers that participate in the communication group; receiving one or more responses to the participation information request on the multicast channel of the local network from one or more peers that participate in the communication group; selecting one or more of the peers from which the one or more responses were received based on a network topology condition to reduce communication latency in at least a portion of the communication group; and communicating with the one or more selected peers to distribute information within the communication group. Other implementations can include corresponding systems, apparatus, and computer programs, configured to perform the actions of the methods, encoded on computer storage devices.

These and other implementations can include one or more of the following features. Some implementations can include monitoring for a participation information request sent by a new peer on the multicast channel of the local network, determining whether to respond to the participation information request sent by the new peer, and selectively responding to the new peer, based on the determining, with information indicative of a participation in the communication group. Some implementations can include monitoring, on the multicast channel of the local network, for responses to the participation information request sent by the new peer. Determining whether to respond to the participation information request sent by the new peer can include determining whether to respond based on a number of monitored responses and a maximum number of responses threshold value.

Sending the participation information request on the multicast communication channel can include transmitting a multicast data packet in accordance with Internet Protocol (IP) multicast. A multicast data packet can include an IP multicast address associated with the communication group. Transmitting the multicast data packet can include setting a time-to-live (TTL) field of the multicast data packet to one to limit the multicast data packet to the local network.

Some implementations can include updating at least a portion of a topology of the communication group based on a result of the selecting one or more of the peers from which the one or more responses were received. The communication group can include a peer-to-peer overlay network. Some implementations can include using a digital key associated with the communication group to authenticate or decrypt the one or more received responses. Selecting one or more of the peers can include selecting one or more received responses that are authenticated or decrypted by the digital key.

In another aspect, methods for peer discovery can include determining peer identities of one or more peers associated with a communication group, the communication group arranged to distribute information between group members; operating a computer associated with the communication group to send a media stream via a native multicast communication channel to one or more peers; and inserting one or more messages into the media stream to communicate one or more of the determined peer identities to effect an update in a topology of the communication group. Inserting one or more messages can include inserting one or more messages that include an Internet Protocol (IP) address associated with one of the determined peer identities. The native multicast communication channel can be an IP multicast channel. Other implementations can include corresponding systems, apparatus, and computer programs, configured to perform the actions of the methods, encoded on computer storage devices.

In yet another aspect, systems for peer discovery can include a local network to network different endpoints and multiple endpoints in communication with the local network that are configured to perform one or more operations described herein.

Particular embodiments of the subject matter described in this document can be implemented so as to realize one or more of the following advantages. The technologies described herein can improve the performance of a communication group such as a peer-to-peer network overlay by finding more and potentially better peers. Finding additional peers can reduce latency, can enable or optimize load-balancing, can optimize the use of network resources, and can increase reliability. A disclosed technology can find peers on a shared LAN segment that may not have been found when using only unicast connections in a peer-to-peer overlay network.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In order to establish, and expand, a communication group such as a peer-to-peer overlay network, participating peers should know at least one other peer in the group. Some communication groups can use a bootstrapping method to expand the group's membership knowledge. For example, a new peer is given the address of one or more existing peers and those existing peers send information about other members. In some P2P networks, e.g., a conventional gossip-based P2P overlay network, the likelihood of discovering a peer that is on the same local network through randomly probing or communicating with different peers in the P2P network may be difficult or unlikely when the total number of participants is significantly larger than the number of participants on a local network. In some instances, heuristics such as those based on network addresses for attempting to find local peers can be hindered by procedures such as Network Address Translation (NAT) and by the decoupling of network addresses and physical network layout. The technologies described herein include different techniques that use network-level multicast such as native IP multicast to provide group members information about additional peers that are on a local network.

Upon joining a communication group, a peer connected to a local area network (LAN) can multicast to the LAN a participation information request message. Thereafter, the peer can periodically send additional participation information request messages. A participation information request message can be indicative of the peer's participation in the communication group and can be indicative of the peer's request to receive messages from other peers already established in that group. The message can include a solicitation for other peers that are participating in the communication group. The peer can establish communications with others peers in the communication group via unicast channels before sending a multicast message.

A peer that is responding to a participation information request can multicast a response, and other peers that might respond can monitor such responses in order to ensure that the number of responses to a single query is kept reasonably small, e.g., five responses to a single query.

In some implementations, a peer can obtain a stream description associated with the communication group. The stream description can include a multicast address or be indicative of a multicast address associated with the communication group. In some implementations, the peer can send a participation information request message to a multicast address specified in a stream description.

In some implementations, a server can send a media stream via native multicast to multiple endpoints. The server can insert messages into that multicast stream, the messages can include peer identifiers of peers which are known or believed to be in the communication group. A message can include contact information for a peer such as an IP address and port number.

A peer receiving information about a new potential neighbor can wait to add the newly-discovered endpoint as a neighbor. For example, a peer receiving information about a new potential neighbor can add that potential neighbor to its list of known participants and then perform a sort of the list to determine if this potential neighbor is a better neighbor to communicate with than a different neighbor on its list. For example, as the number of peers receiving this new peer's announcement increases, the number of peers which will attempt to connect to the announcing endpoint can increase in a logarithmic fashion such that the number of connection attempts can be nearly constant for any number of peers receiving such new announcement.

A communication group can use a self organizing network topology to arrange communications between peers. A self organizing network topology can refer to a network topology where endpoints determine a network topology based, at least in part, on direct communication between peers. For example, peers can directly communicate with one another to share information regarding other peers available on the peer-to-peer network, so that individual peers can gather information regarding the network topology. In some implementations, a peer can request or determine information relating to one or more different peers available for communication. For example, a peer can request information relating to one or more performance characteristics of the other peers, such as a latency time, bandwidth, file transfer time, or a network reliability metric associated with a peer. In a different example, the peer can determine performance characteristics of other peers based, at least in part, on communication with the other peers.

Conditions associated with one or more peers or communication networks there between can change from time to time. Accordingly, the network topology of a communication group can change based on such conditions. Moreover, members of a communication group can change and can have their numbers increase or decrease. For example, a communication latency associated with one of the peers can change over time due to a variety of factors, including local conditions associated with the peer and/or network conditions associated with the peer. Peers can use native network multicast services to locate lower latency endpoints and to monitor for new peers in a local portion of a communication group to effect changes in a communication topology.

Figure 1A:
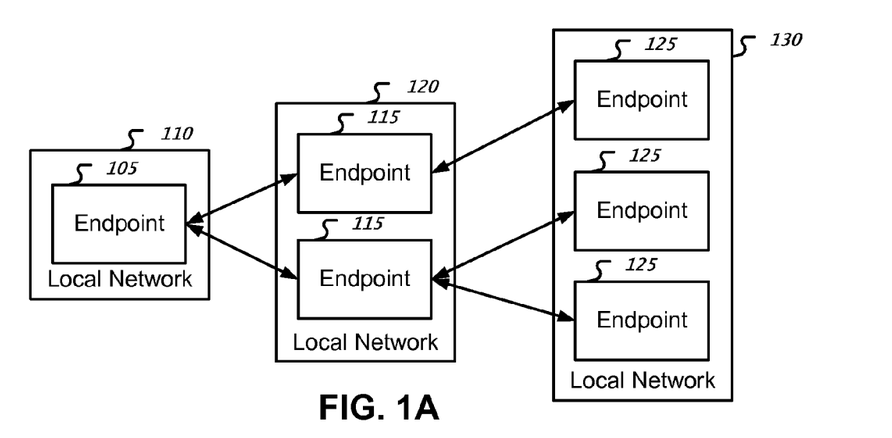
FIGS. 1A, 1B, and 1C show different communication topology examples.
Figure 1B:
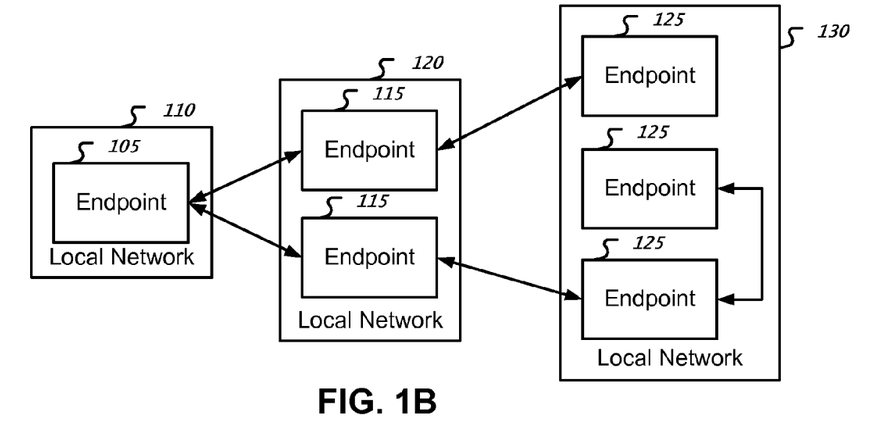
Figure 1C:
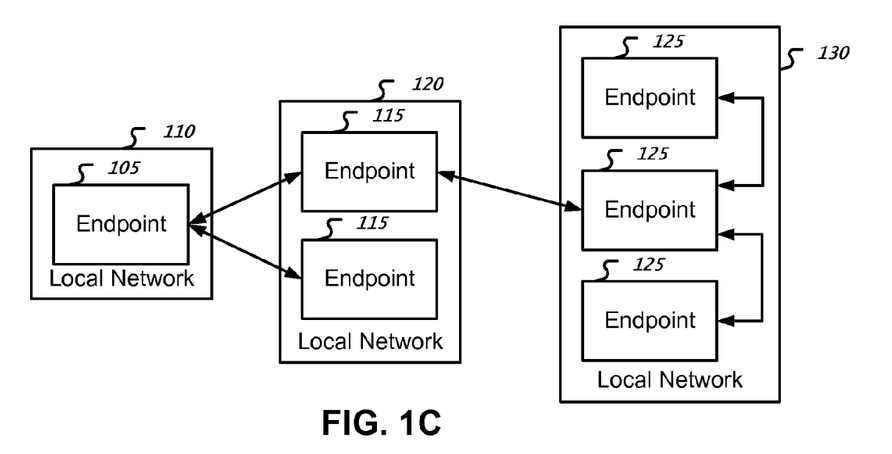

FIGS. 1A, 1B, and 1C show different communication topology examples. A communication topology can control a distribution of application level multicast data between endpoints participating in a communication group. A topology can change over time. For example, a topology can evolve based on endpoints joining the group, endpoints leaving the group, and endpoints discovering connections with different endpoints in the group that reduce latency. In some implementations, each endpoint can effect a change in a portion of the topology. In some implementations, one or more endpoints designated as a server can effect changes to the topology.

FIG. 1A shows an example of initial topology between endpoints in a communication group. A communication group can include endpoints 105, 115, 125 located on different local networks 110, 120, 130. In some implementations, local networks 110, 120, 130 are interconnected via a larger network such as the Internet. A first local network 110 can include one or more endpoints 105. A second local network 120 can include one or more endpoints 115. A third local network 130 can include one or more endpoints 125. In this example, an endpoint 105 in the first local network 110 can send data to one or more endpoints 115 on the second local network 120 which can, in turn, send the data to one or more endpoints 125 on the third area network 130. The endpoints 105, 115, 125 can use unicast channels to send data. An endpoint 105, 115, 125 can partake of the data, such as by playing audio or video streams or accessing content in the data, in addition to forwarding the data to a different endpoint 105, 115, 125. The endpoints 105, 115, 125 may be initially unaware of other endpoints within their respective local networks 110, 120, 130 as data can flow between endpoints over unicast channels.

FIG. 1B shows an example of a different topology between endpoints in the communication group. Endpoints 115, 125 within respective local networks 120, 130 can communicate with different respective local endpoints 115, 125 in the communication group over a native multicast channel. For example, endpoints 125 within the third local network 130 can communicate with other, local, endpoints 125 over a native multicast channel. Such native multicast communication can effect a change in the topology of the communication group. For example, unicast connections between endpoints in the communication group can be created, modified, or deleted when a peer finds out about a different peer that is connected to the same local network. Changes to a communication group's topology can reduce latency and can effect a more efficient usage of network resources such as by removing one or more duplicative unicast distribution channels between local networks 110, 120, 130. However, in some implementations, duplicative unicast distribution channels can provide greater reliability and load-balancing capabilities.

FIG. 1C shows an example of a different topology between endpoints in the communication group. In this example, after discovering other peers, one endpoint 125 in the third local network 130 can receive application level multicast data from an endpoint 115 in the second local network 120 and can forward said data to other endpoints 125 in the third local network 130.

Figure 2:
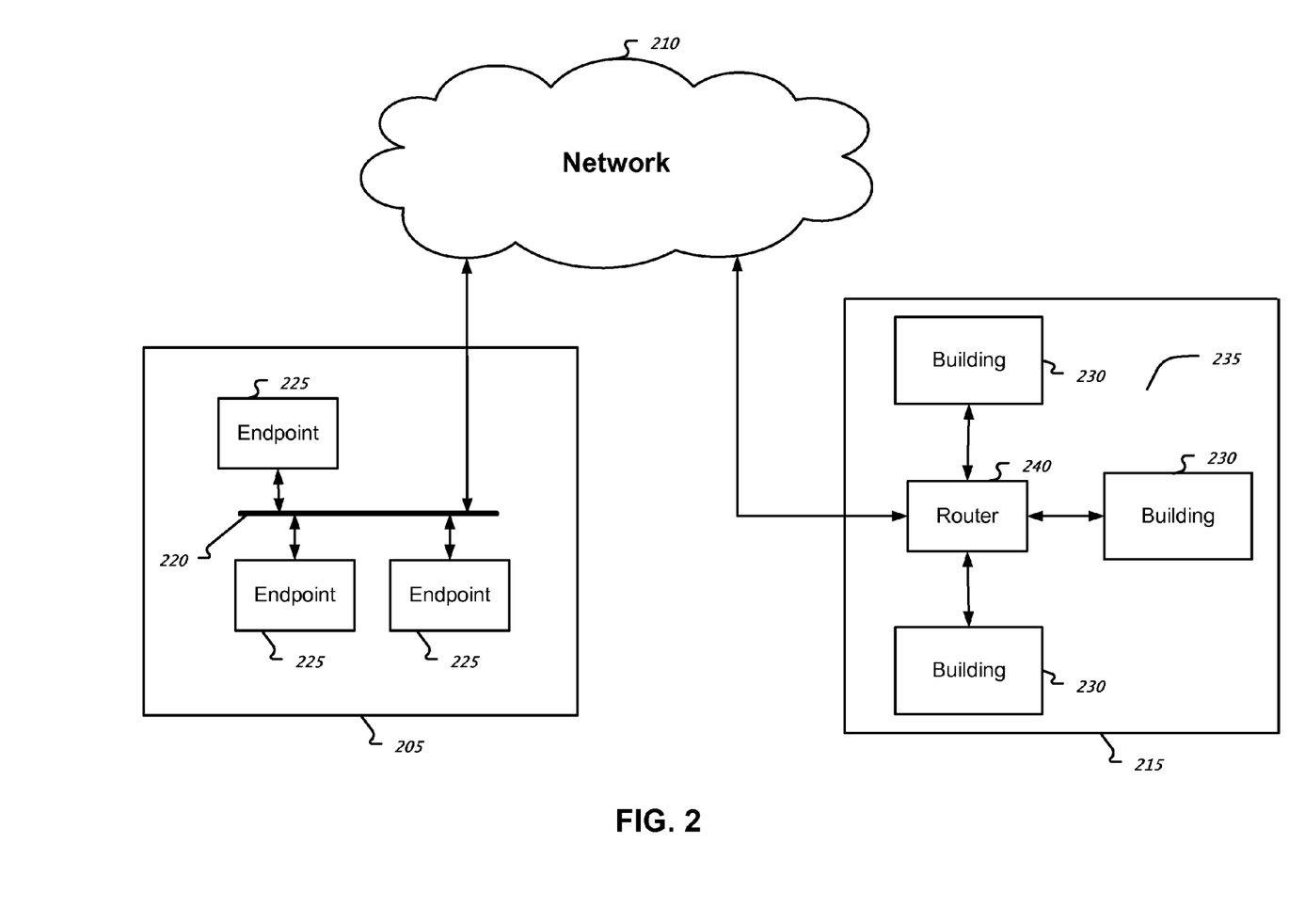
FIG. 2 shows an example of a network architecture.

FIG. 2 shows an example of a network architecture. A network 210 such as the Internet can connect local networks in different locations such a building 205 at one location and a campus 215 at a different location. A building 205 can include a local network 220 such as Ethernet to connect different endpoints 225 within the building. In some implementations, a local network 220 can include an Ethernet hub that connects endpoints 225 on the local network 220. In some implementations, a local network 220 can include a switch or a router that individually communicates with endpoints 225 on the local network 220. In some implementations, a local network 220 can include a wireless network that supports IP multicast. A campus 215 can include a local network 235 that extends into multiple buildings 230. Endpoints in buildings 230 located on the campus 215 can be networked with endpoints in different buildings via one or more networking devices, e.g. switch or router 240, of a local network 235. In some implementations, the campus's local network 235 can include a switch or a router 240 capable of native IP multicast.

Various endpoints can include computing devices such as a personal computer or a computer such as a server. An endpoint can include one or more processors that can be programmed or configured to perform one or more operations mentioned in this document. In some implementations, a processor can include multiple processors or processor cores. A network endpoint can be identified as a client, a server, or both, but in any case, a network endpoint necessarily includes some hardware since it includes a physical device.

Endpoints can establish connections with other endpoints using protocols such as a User Datagram Protocol (UDP) or a Transmission Control Protocol (TCP). A network endpoint can run one or more applications that include support for peer-to-peer networks such as the ADOBE® AIR® software, available from Adobe Systems Incorporated, of San Jose, Calif. A network endpoint can use one or more network interfaces. In some implementations, one network interface can be used for both unicast and multicast traffic. A local network can carry both unicast and multicast traffic.

Figure 3:
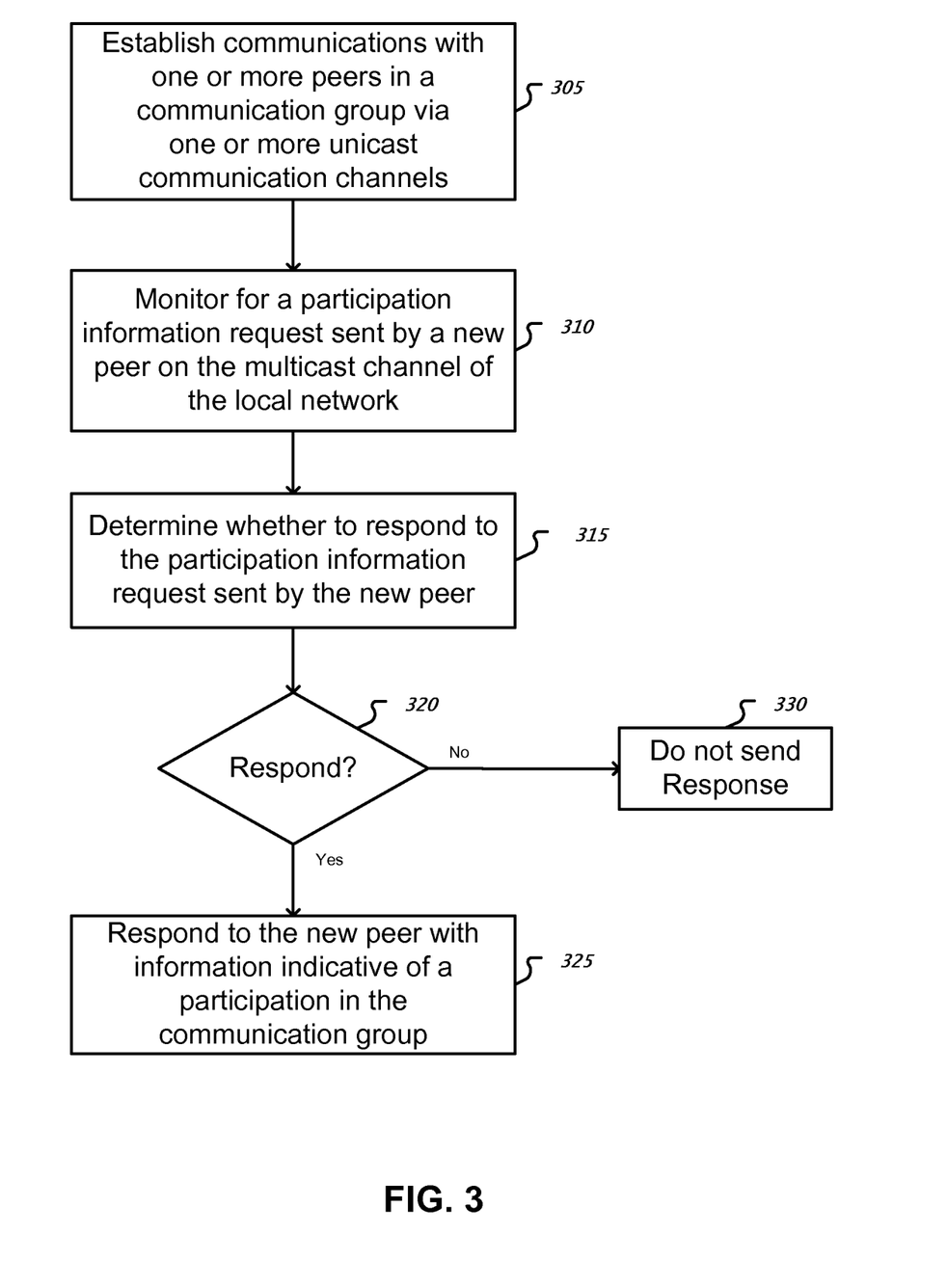
FIG. 3 shows an example of a technique to monitor for and interact with a newly joined peer.

FIG. 3 shows an example of a technique to monitor for and interact with a newly joined peer. An endpoint can establish 305 communications with one or more peers in a communication group via one or more unicast communication channels. The endpoint can monitor 310 for a participation information request sent by a new peer on the multicast channel of the local network. In some implementations, a new peer can be an existing endpoint—already connected to the local network—that has joined the communication group via a unicast connection. In some implementations, a participation information request can include an identifier associated with the communication group. In some implementations, a participation information request can include an IP multicast address and port to indicate a specific communication group. In some implementations, a participation information request can include a stream descriptor that indicates a specific data stream associated with a communication group.

The endpoint can determine 315 whether to respond to the participation information request sent by the new peer. Determining 315 whether to respond can include monitoring for other endpoints to respond or evaluating the request with respect to a network topology condition, or a current network load on the endpoint.

If a response is appropriate 320, then the endpoint can respond 325 to the new peer with information indicative of a participation in the communication group. In some implementations, the endpoint can send a response message that includes a peer identifier. The response message can include an IP address and port number so that a receiving endpoint can communicate with the sending endpoint. If a response is not appropriate 320, then the endpoint does not send a response 330 to the new peer.

Figure 4:
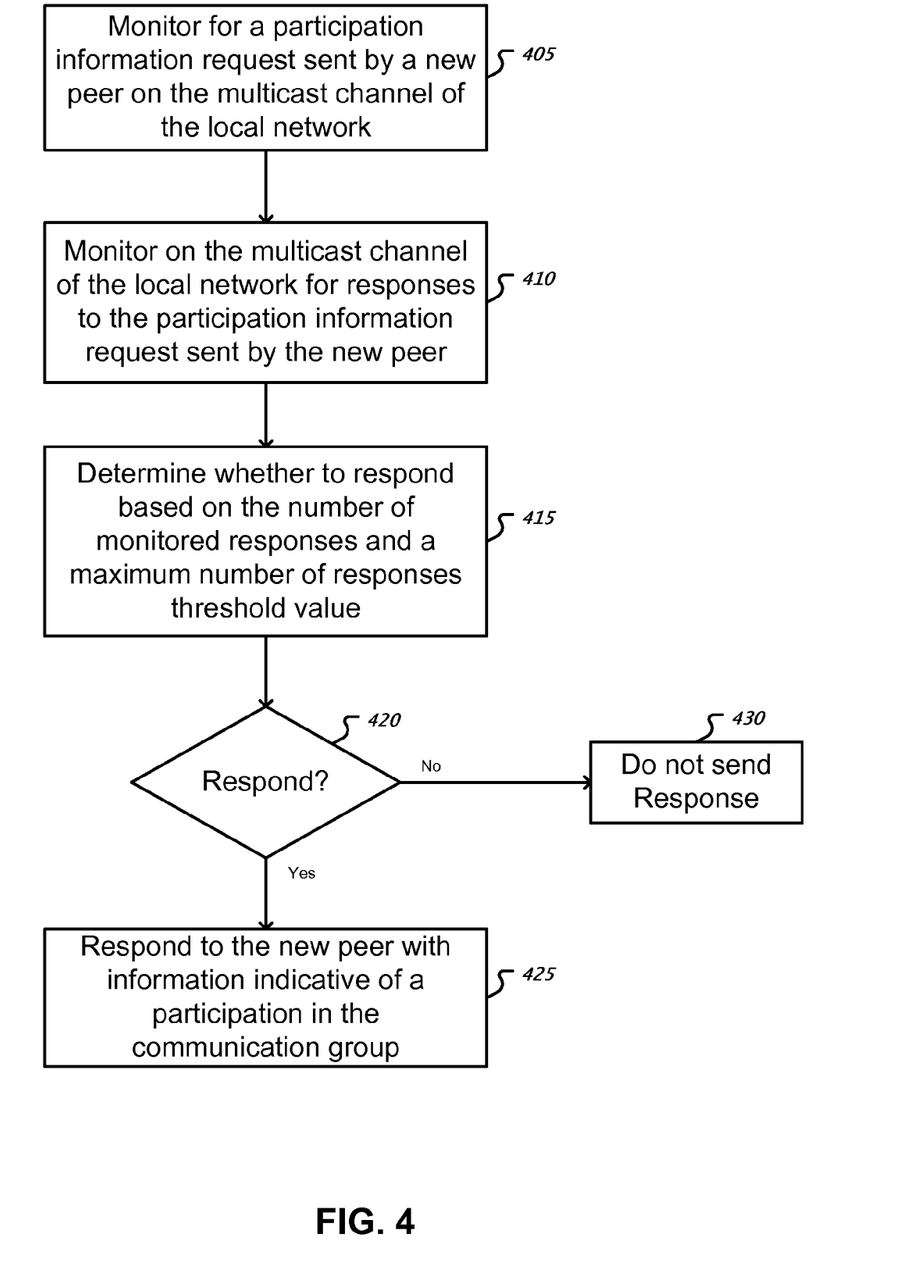
FIG. 4 shows an example of a technique to determine whether to respond to a participation information request.

FIG. 4 shows an example of a technique to determine whether to respond to a participation information request. An endpoint can monitor 405 for a participation information request sent by a new peer on the multicast channel of a local network. The endpoint can monitor 410 on the multicast channel of the local network for responses to the participation information request sent by the new peer. In some implementations, the endpoint can randomly select a value for a waiting period, during which, the endpoint can monitor for responses from other peers in the communication group. The waiting period value can be a different value for each time an endpoint monitors 410 for responses. Different endpoints can have different waiting period values.

The endpoint can determine 415 whether to respond based on the number of monitored responses and a maximum number of responses threshold value. If a response is appropriate 420, then the endpoint can respond 425 to the new peer with information indicative of a participation in the communication group. For example, if the waiting period expired and five responses have not been observed (where five is an example of a threshold value), then the endpoint can send a response to the new peer. If a response is not appropriate 420, then the endpoint does not send a response 430 to the new peer. For example, if five responses have been observed, then the endpoint does not respond to the new peer.

Figure 5:
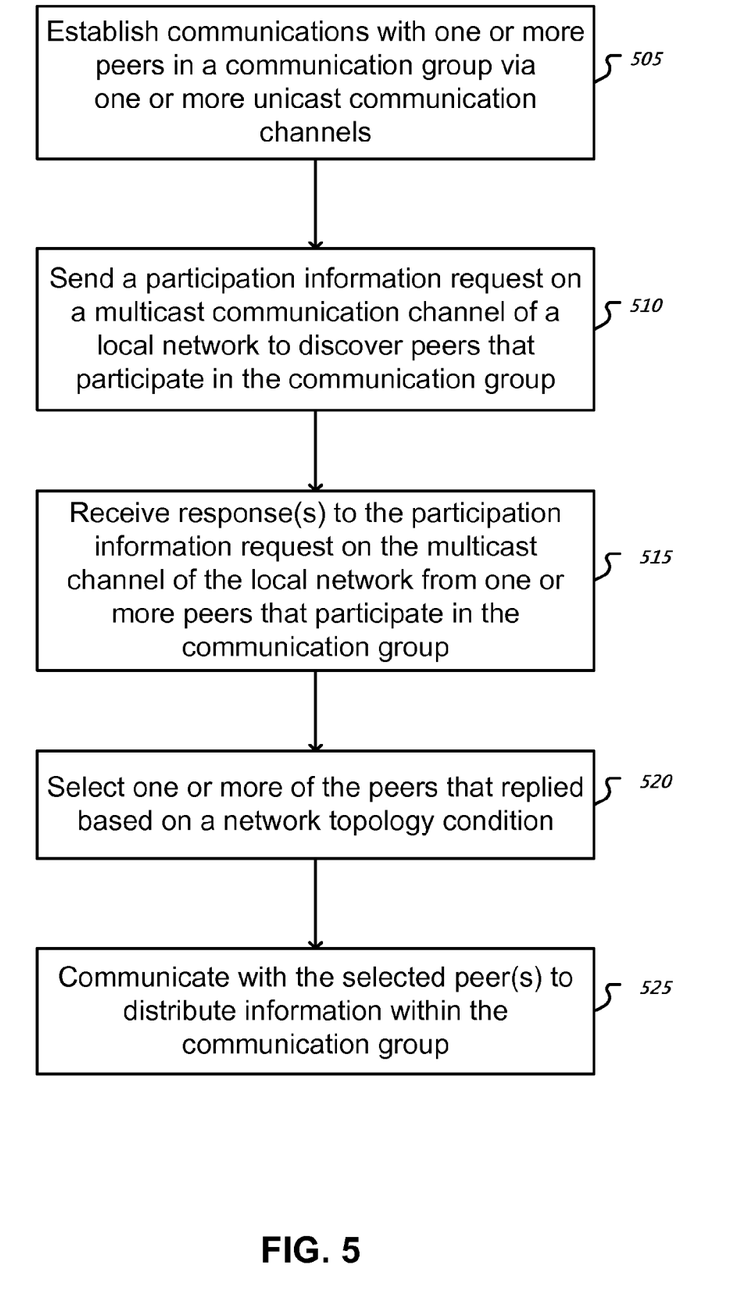
FIG. 5 shows an example of a technique to solicit participation information from peers in a communication group that reside on a local network.

FIG. 5 shows an example of a technique to solicit participation information from peers in a communication group that reside on a local network. An endpoint can establish 505 communications with one or more peers in a communication group via one or more unicast communication channels. In some implementations, the endpoint can receive information that include an initial set of peers; the information can include one or more addresses, e.g., IP addresses, corresponding to one or more endpoints that are peers in the communication group. The endpoint can use the one or more addresses to establish separate unicast connections with the peers.

The endpoint can send 510 a participation information request on a multicast communication channel of a local network to discover other endpoints on the local network that are peers in the communication group. Sending 510 the participation information request on the multicast communication channel can include transmitting an IP multicast data packet. In some implementations, the multicast data packet has an IP multicast address associated with the communication group as the packet's destination address. In some implementations, the endpoint can set a time-to-live (TTL) field of the multicast data packet to one to limit the multicast data packet to the local network or at least a portion of the local network.

The endpoint can receive 515 one or more responses to the participation information request on the multicast channel of the local network. In some implementations, the endpoint can receive a response to the participation information request via a unicast channel. The endpoint can select 520 one or more of the peers that replied based on a network topology condition. Selecting 520 peers can include using a network topology condition such as latency between endpoints or bandwidth capacity between endpoints. For example, the endpoint can select peers to reduce communication latency in at least a portion of the communication group. The endpoint can communicate 525 with the one or more selected peers to distribute information within the communication group. For example, the endpoint can send or receive information from the one or more selected peers to distribute information within the communication group. The endpoint can forward data to different peers in the communication group.

Some communication group implementations can use one or more techniques to safe-guard data and identities. A communication group can use an encryption technique to protect data on a peer-to-peer network. A communication group can use an authentication technique to verify peers that send data. Various encryption and authentication techniques can use a digital key or private and public key pairs. Members of a communication group can obtain or generate a digital key to encrypt/decrypt data and/or authenticate communications. Accordingly, in some implementations, a peer can use a digital key associated with the communication group to authenticate or decrypt responses or stream data from other peers. Moreover, selecting 520 one or more of the peers that responded can include selecting a peer whose response is successfully authenticated or decrypted by a digital key associated with the communication group.

Figure 6:
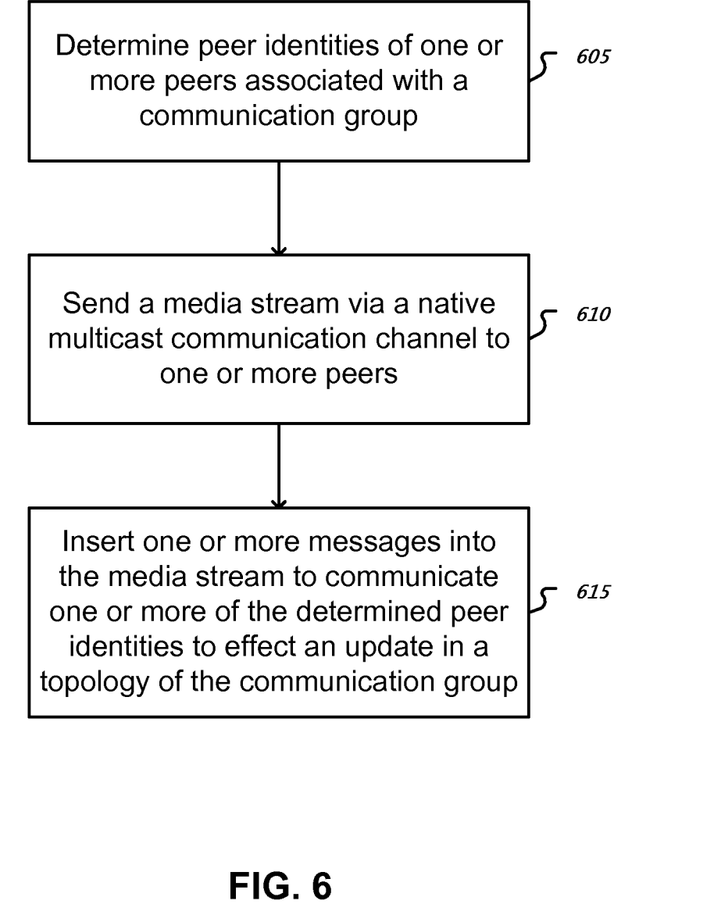
FIG. 6 shows an example of a technique that inserts peer identities into a multicast data stream.

FIG. 6 shows an example of a technique that inserts peer identities into a multicast data stream. An endpoint can determine 605 peer identities of one or more peers associated with a communication group. In some implementations, the endpoint can access stored identities of endpoints associated with current or previous group communications. The endpoint can send 610 a media stream via a native multicast communication channel to one or more peers. In some implementations, the native multicast communication channel is an IP multicast channel. The endpoint can insert 615 one or more messages into the media stream to communicate one or more of the determined peer identities to effect an update in a topology of the communication group. In some implementations, such a message inserted into a media stream can include an IP address associated with one of the determined peer identities. For example, a media stream can feature video data interleaved with a message that includes peer identities.

Figure 7:
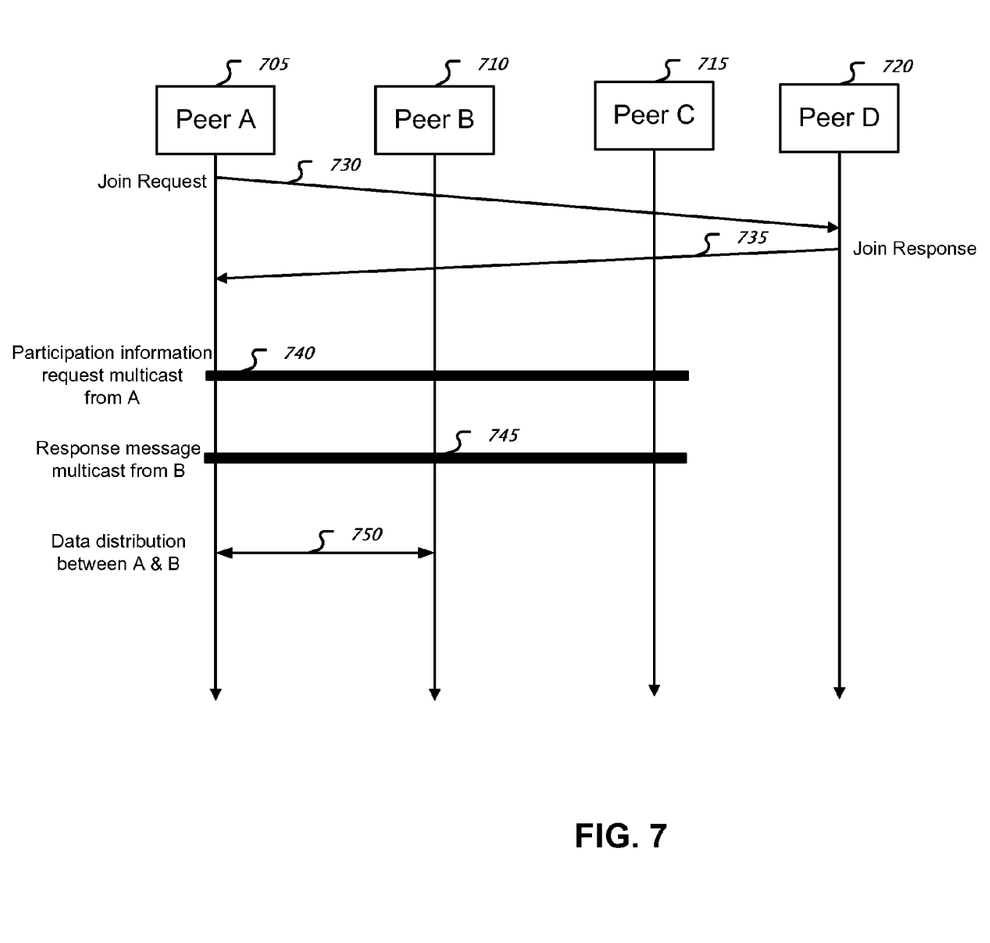
FIG. 7 shows an example of a communication flow between endpoints associated with a communication group.

FIG. 7 shows an example of a communication flow between endpoints associated with a communication group. This example features peer A, peer B, peer C, and peer D (respectively 705, 710, 715, 720). Peer A can send a join request to join a communication to peer D (730). Peer D can send a join response to peer A (735). Peer A can send a participation information request message on a native multicast channel (740). Peer B, that receives the multicast message, can multicast a response on the native multicast channel (745). If peer A selects peer B, then peers A and B can distribute data (750).

Figure 8:
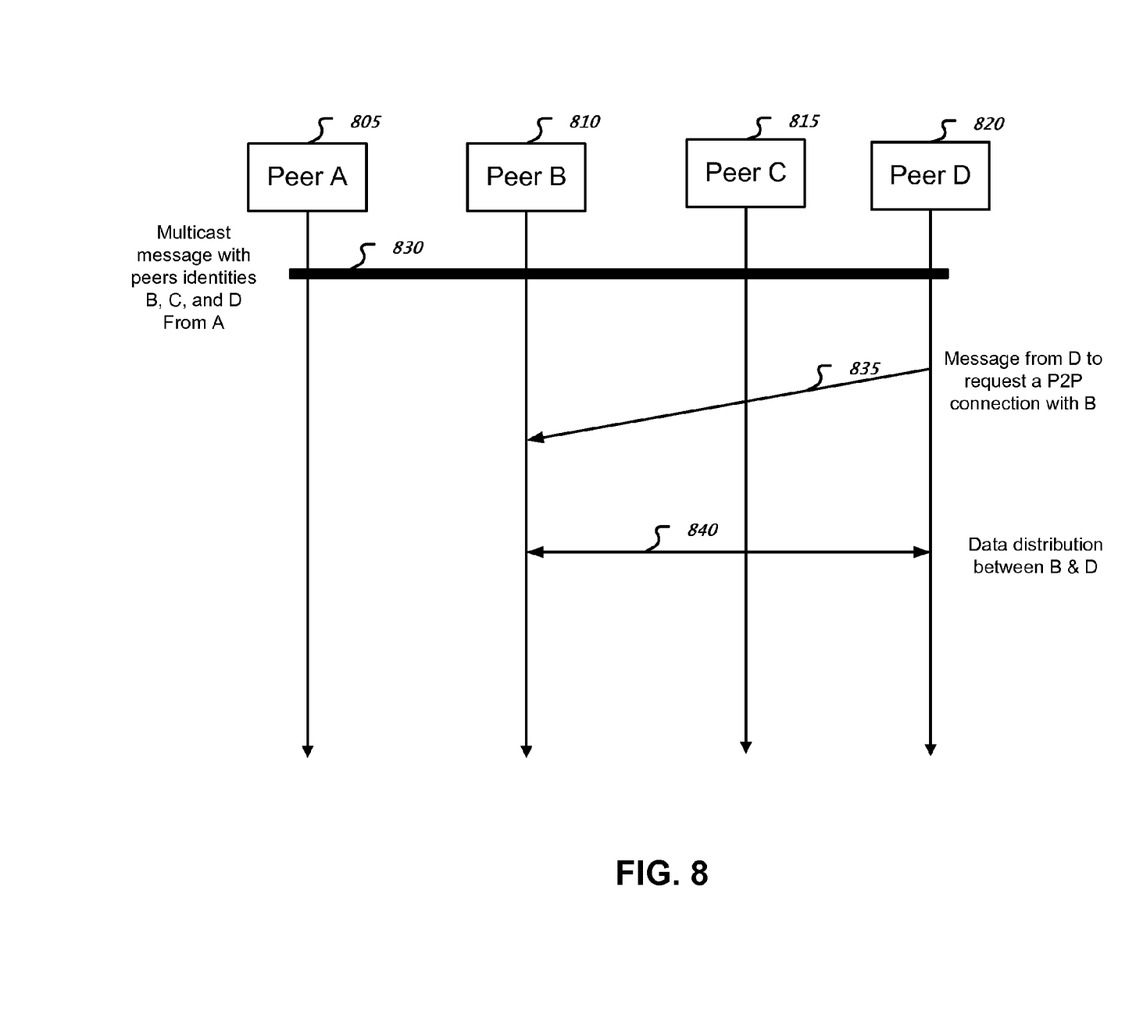
FIG. 8 shows a different example of a communication flow between endpoints associated with a communication group.

FIG. 8 shows a different example of a communication flow between endpoints associated with a communication group. This example features peer A, peer B, peer C, and peer D (respectively 805, 810, 815, 820). Peer A can send a data stream on a native multicast channel, the stream including the identities of peers B, C, and D (830). Peer D can select one or more of the three peers, e.g., peer B, and can send a peer-to-peer (P2P) connection request to peer B (835) over a unicast channel or multicast channel. If peer B accepts, then peers B and D can distribute data (840).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   establishing communications with one or more peers in a communication group using a self organizing network topology to arrange communications between the peers via one or more unicast communication channels to join the communication group, the communication group arranged to distribute information directly between group members via a peer-to-peer overlay network;
   in response to establishing communications with one or more of the peers in the communication group via the one or more unicast communication channels, receiving, from at least one peer in the communication group, a stream description that specifies a multicast address;
   sending, after joining the communication group, a participation information request to the multicast address on a multicast communication channel of a local network to discover peers on the local network that already use the peer-to-peer overlay network to participate in the communication group;
   receiving one or more responses to the participation information request on the multicast communication channel of the local network from one or more peers that participate in the communication group;
   selecting one or more of the one or more peers from which the one or more responses were received based on a network topology condition to reduce communication latency in at least a portion of the communication group;
   updating at least a portion of a topology of the communication group based on a result of the selecting; and
   communicating with the one or more selected peers to distribute information within the communication group based on the topology.

2. The method of claim 1, further comprising:
   monitoring for a participation information request sent by a new peer on the multicast communication channel of the local network;
   determining whether to respond to the participation information request sent by the new peer; and
   selectively responding to the new peer, based on the determining, with information indicative of a participation in the communication group.

3. The method of claim 2, further comprising:
   monitoring, on the multicast communication channel of the local network, for responses to the participation information request sent by the new peer,
   wherein determining whether to respond to the participation information request sent by the new peer comprises determining whether to respond based on a number of monitored responses and a maximum number of responses threshold value.

4. The method of claim 1, wherein sending the participation information request to the multicast address on the multicast communication channel comprises transmitting a multicast data packet in accordance with Internet Protocol (IP) multicast, the multicast data packet comprising an IP multicast address associated with the communication group.

5. The method of claim 4, wherein transmitting the multicast data packet comprises setting a time-to-live (TTL) field of the multicast data packet to one to limit the multicast data packet to the local network.

6. The method of claim 1, further comprising:
   using a digital key associated with the communication group to authenticate or decrypt the one or more received responses,
   wherein selecting one or more of the peers comprises selecting one or more received responses that are authenticated or decrypted by the digital key.

7. A computer-implemented method for updating a multicast network topology of a communication group in response to a new peer joining the communication group via a unicast communication channel, the method comprising:
   using the unicast communication channel to establish communications between the new peer and one of a plurality of existing peers that form part of the communication group using a self organizing network topology to arrange communications between the peers, thus resulting in the new peer joining the communication group, wherein the communication group comprises a plurality of local networks each of which comprises one or more of the existing peers, and wherein the communication group has the multicast network topology, the communication group arranged to distribute information directly between group members via a peer-to-peer overlay network;
   in response to establishing communications with the one of the plurality of existing peers in the communication group via the unicast communication channels, receiving, from the one of the plurality of existing peers in the communication group, a stream description that specifies a multicast address;
   sending, after joining the communication group, a participation information request from the new peer to the multicast address on a multicast communication channel of a particular local network to discover the existing peers on the particular local network, wherein the particular local network includes the new peer;
   receiving, by the new peer, one or more responses to the participation information request on the multicast communication channel, wherein each response is received from one of the existing peers;
   making a selection of one or more existing peers which responded to the participation information request based on a network topology condition, wherein the selection reduces communication latency in at least a portion of the communication group;
   generating an updated multicast network topology based on the selection; and communicating with the selected one or more existing peers which responded to the participation information request using the updated multicast network topology.

8. The method of claim 7, wherein the one or more responses to the participation information request each include information indicative of a participation in the communication group.

9. The method of claim 7, wherein the participation information request includes a maximum number of responses threshold value.

10. The method of claim 7, wherein sending the participation information request comprises transmitting a multicast data packet in accordance with internet protocol (IP) multicast, the multicast data packet comprising an IP multicast address associated with the communication group.

11. The method of claim 7, wherein:
sending the participation information request comprises transmitting a multicast data packet in accordance with internet protocol (IP) multicast, the multicast data packet comprising an IP multicast address associated with the communication group; and
transmitting the multicast data packet comprises setting a time-to-live field of the multicast data packet to one to limit the multicast data packet to the particular local network.

12. The method of claim 7, further comprising using a digital key associated with the communication group to authenticate or decrypt the one or more responses to the participation information request.

13. A system comprising:
a plurality of local networks arranged to form a communication group having a multicast network topology, wherein each of the local networks includes one or more peers;
a first peer in communication with a particular local network; and
a plurality of existing peers in the particular local network;
wherein the first peer is configured to perform operations comprising:
using a unicast communication channel to establish communications with one of the plurality of existing peers that form part of the communication group using a self organizing network topology to arrange communications between the peers, thus resulting in the first peer joining the communication group, the communication group arranged to distribute information directly between group members via a peer-to-peer overlay network;
in response to establishing communications with the one of the plurality of existing peers in the communication group via the unicast communication channels, receiving, from the one of the plurality of existing peers in the communication group, a stream description that specifies a multicast address;
sending, after joining the communication group, a participation information request to the multicast address on a multicast communication channel of the particular local network to discover the existing peers on the particular local network;
receiving one or more responses to the participation information request on the multicast communication channel, wherein each response is received from one of the existing peers;
making a selection of one or more existing peers which responded to the participation information request based on a network topology condition, wherein the selection reduces communication latency in at least a portion of the communication group;
generating an updated multicast network topology based on the selection; and
communicating with the selected one or more existing peers which responded to the participation information request using the updated multicast network topology.

14. The system of claim 13, wherein the one or more responses to the participation information request each includes information indicative of a participation in the communication group.

15. The system of claim 13, wherein the participation information request includes a maximum number of reposes threshold value.

16. The system of claim 13, wherein sending the participation information request comprises transmitting a multicast data packet in accordance with internet protocol (IP) multicast, the multicast data packet comprising an IP multicast address associated with the communication group.

* * * * *